United States Patent
Wang et al.

(10) Patent No.: US 8,543,068 B2
(45) Date of Patent: Sep. 24, 2013

(54) PULSE COUPLED OSCILLATOR SYNCHRONIZATION FOR WIRELESS COMMUNICATIONS

(75) Inventors: Xiao Y. Wang, Ithaca, NY (US); Alyssa B. Apsel, Ithaca, NY (US)

(73) Assignee: Cornell University, Ithaca, NY (US)

( * ) Notice: Subject to any disclaimer, the term of this patent is extended or adjusted under 35 U.S.C. 154(b) by 603 days.

(21) Appl. No.: 12/670,682

(22) PCT Filed: Aug. 4, 2008

(86) PCT No.: PCT/US2008/072141
§ 371 (c)(1),
(2), (4) Date: Feb. 22, 2010

(87) PCT Pub. No.: WO2009/029395
PCT Pub. Date: Mar. 5, 2009

(65) Prior Publication Data
US 2010/0190517 A1    Jul. 29, 2010

Related U.S. Application Data

(60) Provisional application No. 60/953,859, filed on Aug. 3, 2007.

(51) Int. Cl.
*H04B 1/38* (2006.01)
(52) U.S. Cl.
USPC ........... 455/73; 455/83; 455/85; 455/86; 455/112; 455/118; 455/500; 375/219; 375/327; 375/371; 375/375; 375/373
(58) Field of Classification Search
USPC .......... 455/500, 85, 83, 86, 112, 118, 73; 375/130, 141, 371, 376, 327, 373, 219, 360; 342/389.99
See application file for complete search history.

(56) References Cited

U.S. PATENT DOCUMENTS

| | | | | |
|---|---|---|---|---|
| 6,762,712 B2 * | 7/2004 | Kim | | 342/135 |
| 6,812,884 B2 * | 11/2004 | Richley et al. | | 342/125 |
| 6,952,456 B1 * | 10/2005 | Aiello et al. | | 375/295 |
| 6,959,031 B2 * | 10/2005 | Haynes et al. | | 375/130 |
| 6,970,448 B1 * | 11/2005 | Sparrell et al. | | 370/347 |
| 6,989,782 B2 * | 1/2006 | Walker et al. | | 342/134 |

(Continued)

FOREIGN PATENT DOCUMENTS
EP    1852998 A1    11/2007

OTHER PUBLICATIONS

Hong, Y.-W. et al. A Scalable Synchronization Protocol for Large Scale Sensor Networks and Its Applications, IEEE J. Sac, 23(5), 1085-1099, May 2005.

(Continued)

*Primary Examiner* — Marceau Milord
(74) *Attorney, Agent, or Firm* — Burns & Levinson LLP; Jacob N. Erlich; David W. Gomes

(57) ABSTRACT

A transceiver node includes a pulse coupled oscillator in an integrated circuit, which can synchronize with other nodes to generate a global clock subsequently used to facilitate synchronous communications between individual nodes. Known potential uses include a low power sensor node radio for an ad-hoc network for military applications and medical applications such as ingestible and implantable radios, self powered radios, and medical monitoring systems such as cardiac and neural monitoring patches.

17 Claims, 10 Drawing Sheets

(56) References Cited

U.S. PATENT DOCUMENTS

| | | | |
|---|---|---|---|
| 7,046,618 B2* | 5/2006 | Santhoff et al. | 370/205 |
| 7,088,795 B1* | 8/2006 | Aiello et al. | 375/356 |
| 7,233,630 B2* | 6/2007 | Murakami et al. | 375/316 |
| 7,292,656 B2* | 11/2007 | Kloper et al. | 375/340 |
| 7,356,019 B2* | 4/2008 | Hirt et al. | 370/347 |
| 7,366,754 B2* | 4/2008 | Wetzel et al. | 709/203 |
| 7,369,598 B2* | 5/2008 | Fontana et al. | 375/130 |
| 7,480,324 B2* | 1/2009 | Aiello et al. | 375/130 |
| 7,483,483 B2* | 1/2009 | Lakkis | 375/238 |
| 7,545,188 B1* | 6/2009 | Xu et al. | 327/157 |
| 7,606,335 B2* | 10/2009 | Kloper et al. | 375/340 |
| 7,609,608 B2* | 10/2009 | Rogerson et al. | 370/203 |
| 7,664,760 B2* | 2/2010 | Christian et al. | 707/737 |
| 7,929,596 B2* | 4/2011 | Lakkis | 375/229 |
| 8,045,935 B2* | 10/2011 | Lakkis et al. | 455/91 |
| 8,102,905 B2* | 1/2012 | Roovers et al. | 375/228 |
| 8,111,783 B2* | 2/2012 | Kloper et al. | 375/316 |

OTHER PUBLICATIONS

Mirollo, R. E. et al. Synchronization of Pulse-Coupled Biological Oscillators, Siam J. Appl. Math. 50(6), 1645-1662, Dec. 1990.

Bush, S. F. Low-Energy Sensor Network Time Synchronization as an Emergent Property, ICCCN 2005, Proc. 14th Int'l Conf. Comp. Comm. & Net., Oct. 17-19, 2005, 93-98.

International Search Report dated Apr. 16, 2009 for PCT/US08/72141.

* cited by examiner

PULSE COUPLED OSCILLATOR SYNCHRONIZATION FOR WIRELESS COMMUNICATIONS

CROSS REFERENCE TO RELATED APPLICATIONS

The present application is the U.S. national phase entry under 35 U.S.C. §371 of International Application No. PCT/US08/72141 filed Aug. 4, 2008 entitled PULSE COUPLED OSCILLATOR SYNCHRONIZATION FOR WIRELESS COMMUNICATIONS, which in turn claims priority to U.S. Provisional Application Ser. No. 60/953,859 filed Aug. 3, 2007 entitled PULSE COUPLED OSCILLATOR BASED SYCHRONIZATION FOR WIRELESS COMMUNICATIONS, which are incorporated by reference herein in their entirety for all purposes.

STATEMENT OF FEDERALLY SPONSORED RESEARCH OR DEVOPMENT

This invention was made with U.S. government support from the Army Research Office, under Contract Number W911NF-05-1-0515. The U.S. government has certain rights in this invention.

FIELD OF THE INVENTION

The present invention generally relates to pulse-synchronized oscillators, and in particular to such devices embodied in semiconductor circuits and used in wireless networks.

BACKGROUND OF THE INVENTION

Many forms of communication rely on a high degree of synchrony between transmitter and receiver to convey information. The examples are numerous: coherent FM receivers utilize phase locked loops, direct spread spectrum techniques are based upon modulating and demodulating a baseband signal with a synchronized chip sequence, optical links feature clock and data recovery receive circuitry, and likewise ultra-wideband (UWB) radio relies on receiver and transmitter synchrony.

Ultra-wideband (UWB) radio is a method of RF/wireless communications utilizing short duration pulses instead of a continuous wave sinusoid to transmit information. FIG. 1 shows the difference between a continuous wave signal 12 and an UWB signal 14. Whereas continuous wave signal 12 is constantly active both during data transmission 11 as well as after 13. UWB signal 14 is only active during pulse transmissions 16, which allows the R.F. front end to be turned off during inactive periods 18.

It is well known that the time-limited, wide spectrum signaling in UWB promises greater network capacity over traditional radio architectures, allowing superior data-rate and spatial capacity at similar power consumption over short distances. The short pulse signaling also allows duty cycling of the RF front end to save power. However, achieving these benefits of ultra-wideband communications is contingent on precise synchronization between transmitter and receiver such that transmitted pulses are received. For instance, if a transmitter and receiver are not synchronized to the same clock and a pulse is transmitted, the receiver may not be active and miss the data. However, if the two are synchronized together, then the receiver will be able to capture the pulse even as the receive duty cycle is reduced.

A popular practical implementation of synchronization is in the use of a high speed DLL/PLL in conjunction with a digital pulse tracking backend that maintains synchronization throughout the period of communications. The drawback of this approach is that the receiver and transmitter clocks must have center frequencies matched on the order of ten to hundreds of parts per million to maintain adequate synchronization, thereby necessitating that the local oscillators of both the transmitter and receiver be referenced to well matched crystals so that frequency drift between them is minimized. This requirement for a crystal imposes a significant cost to a system that a manufacturer would ideally like to avoid.

A popular method of UWB signaling is time hopping for low to medium pulse rates on the order of hundreds of KHz to the low hundreds of MHz. The time hopping method of UWB transmissions is based on a transmitter sending time limited pulses of data at times known by the receiver, which looks at the received signal at the agreed-upon times and determines the data that was sent. FIG. 2 shows a popular manifestation of the above method which divides each UWB transmission packet 20 into frames 22 and then further subdivides those frames 22 into bins 24. Many frames 22 compose a packet 20, while many bins 24 compose a frame 22. Within each frame 22, there can be only one transmission of an UWB data pulse. This transmission will fall into a certain bin 24a. The bin 24a that the pulse falls in will be determined by a template sequence that is common to both receiver and transmitter. Thus a receiver with the same template sequence as the transmitter will know the appropriate bins over which to look for the data, while pulses from other transmitters will fall in other bins where they are ignored. Synchronization is vital in this scheme because without it, the receiver cannot know when the transmitted data is valid.

SUMMARY OF THE INVENTION

In one embodiment, transceiver, comprises one or more integrated circuits including an R.F front end adapted for connection to an antenna, a pulse detector coupled to the R.F. front end and adapted for detecting received pulses intended for the transceiver, and a pulse coupled oscillator including a monotonically increasing state function that is concave downward, wherein the oscillator is adapted for receiving synchronizing pulses from the pulse detector and for causing a predetermined state increment in the state function in response to received synchronizing pulses.

The pulse coupled oscillator may be adapted to include a blackout period, right after a state change, when state increments are not enabled. The pulse detector may be adapted to distinguish synchronizing pulses for the oscillator from data pulses being sent to the transceiver.

The transceiver may further comprise a control timer coupled to the oscillator and adapted to divide each cycle of the oscillator in to a multiplicity of time bins. The control timer may be adapted to enable the transceiver to detect any data signals present in predetermined ones of the time bins. The transceiver may further comprise a controller coupled to the control timer and adapted to disconnect power to the R.F. front end during predetermined time bins. The controller may be adapted to only connect power to the R.F. front end during time bins when the transceiver is intended to receive data pulses and synchronizing pulses.

The transceiver may further comprise a control timer coupled to the oscillator and adapted to divide each cycle of the oscillator in to a multiplicity of time frames and each time frame in to a multiplicity of time bins, wherein the control timer is adapted to enable the transceiver to detect any signals present in a same predetermined time bin in each time frame.

In another embodiment, a wireless network, comprises a plurality of nodes with each node including a respective pulse coupled oscillator implemented in a semiconductor circuit and having a monotonically increasing state function that is concave downward, wherein each oscillator is adapted to generate a change of state pulse at the end of a state function cycle, and transmit/receive circuitry located in each node and adapted for transmitting change of state pulses from each respective oscillator to other nodes in the network, and further adapted for receiving change of state pulses from other nodes in the network and applying them to the respective oscillator to cause a state increment in the respective oscillator.

Each transmit/receive circuitry may include and R.F. front end and a pulse detector coupled to received signals from the R.F. front end and adapted to identify synchronizing delta pulses from the other nodes.

Each pulse coupled oscillator may be adapted to include a blackout period, right after a state change, when state increments are not enabled.

Each node may include a control timer coupled to the respective oscillator and adapted to divide each cycle of the oscillator in to a multiplicity of time bins. The control timer may be adapted to enable the respective transceiver to detect any data signals present in predetermined ones of the time bins. Each node may include a controller coupled to the control timer and adapted to disconnect power to the R.F. front end during predetermined time bins.

Each node may include a control timer coupled to the oscillator and adapted to divide each cycle of the oscillator in to a multiplicity of time frames and each time frame in to a multiplicity of time bins, and wherein the control timer is adapted to enable the transceiver to detect any data signals present in a same predetermined time bin in each time frame.

Each node may be adapted to receive synchronizing pulses from other nodes over the wireless network.

BRIEF DESCRIPTION OF THE DRAWINGS

The present invention is illustratively shown and described in reference to the accompanying drawings, in which.

DETAILED DESCRIPTION OF THE DRAWINGS

Figure 3A:
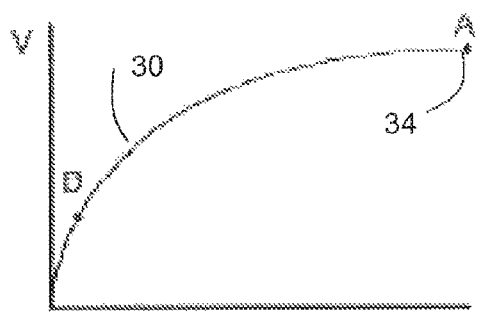
FIGS. 3(a)-(d) are graphical depictions of the state function of two pulse coupled oscillators suitable for use with the present invention.
Figure 3B:
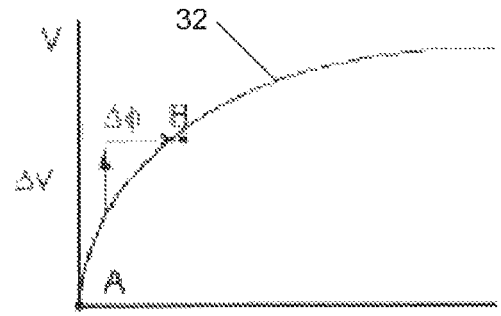
Figure 3C:
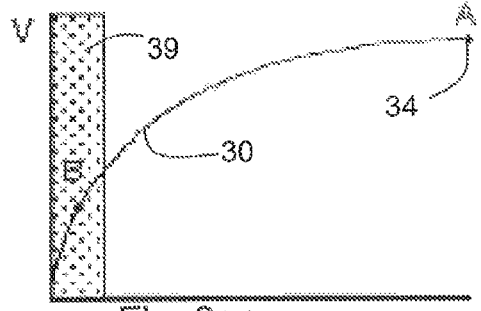

To facilitate synchronization between nodes of a wireless UWB network, the present invention utilizes a pulse coupled oscillator (PCO) system. The PCO system is composed of identical oscillators following a state function 30, 32, as shown in FIGS. 3(a) and 3(b) for two oscillators. The state function 30 for a first oscillator i is a variable $V_i$ that is a function of a normalized time, $\phi_i = t_i/T_0$, where $t_i$ is the time since the first oscillator i last reset and $T_0$ is the time a free running oscillator takes to complete a cycle. All oscillators may start at random initial points A on the state curve and travel along the state function at a constant and identical rate. When the oscillator for state function 30 completes a period at 34, it emits an instantaneous synchronizing or coupling pulse $\Delta V$ to every other oscillator in the system, as indicated for state function 32 for oscillator ii in FIG. 3(b), causing them to advance in state by $\Delta V$ and its associated $\Delta \phi$ then resets to $t_0$. If the state function is monotonically increasing and concave down, then the system of identical oscillators perfectly phase-locks, and hence the firing times also synchronize. Each firing drives the oscillators' phases closer together through the non-linearity of the state function.

The oscillators may also include a blackout period 39, as in FIGS. 3(a) and 3(b), which correspond to the same two state functions. During blackout period 39 no $\Delta V$ coupling is accepted, which introduces a static offset 38 of $\Delta T < T_{blackout}$. This provides synchronization of the nodes even in the presence of propagation delay, path loss and imperfectly matched oscillator nominal frequencies.

Figure 4:
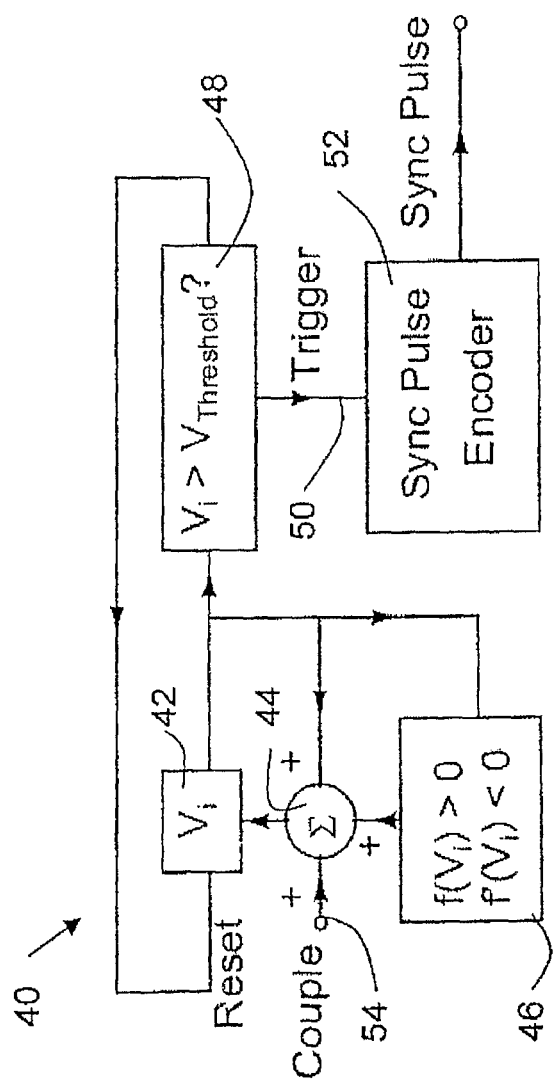
FIG. 4 is a block diagram of an oscillator circuit embodying the state function of FIGS. 3(a)-(d)

A generic system oscillator 40 implementing the state function of FIG. 4 is shown in FIG. 4. The state $V_i$ 42 is constantly added to by an addition block 44 that senses $V_i$ and adds a $f(V_i)$ 46 that is positive and decreasing for increasing values of $V_i$. $V_i$ 44 then feeds into a threshold detector 48 that sends a trigger signal 50 when the threshold is reached. The trigger signal may then be encoded at 52 in such a way as make it more immune to noise and interference, and to differentiate it from other pulses. Finally, $V_i$ 44 accepts positive external coupling through the couple input 54 to implement the coupling aspects of the PCO.

An example of an all analog, on chip implementation of the generic oscillator 40 of FIG. 4 is the circuit 60 of FIG. 4. The PCO state function is represented by the voltage A at node 62 with respect to time. Node 62 is charged up by a current source $I(V_A)$ 64 that is monotonically decreasing with $V_A$. When $V_A$ exceeds the threshold set by $V_{threshold}$ 66 as determined by comparator 68, it goes through a delay path 70 that causes a switch 72 to discharge voltage A on node 62 rapidly to ground, thereby generating an output pulse to sync pulse encoder 72 of width controlled by the delay path. The $\Delta V$ function is provided by a synchronizing pulse turning on current source 74 for a predetermined pulse width.

Figure 6A:
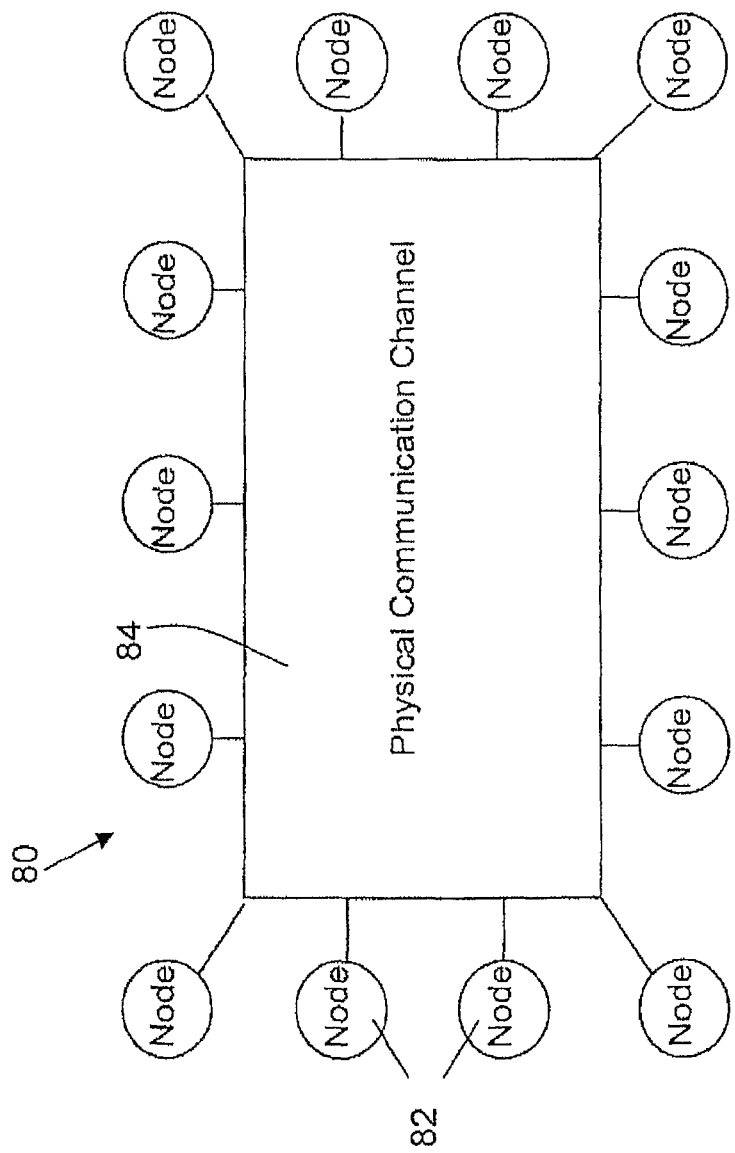
FIG. 6A is a generic network block diagram of a network constructed in accordance with one embodiment of the present invention.

A generic system level view of a network 80 is shown in FIG. 6A. The nodes 82 are connected to every other node through a communications channel 84. One possible manifestation of this communications channel is a wireless link. The most general form of an individual node 82 is diagrammed in FIG. 6B. Each node 82 implements a physical interface driver 86 to interface with the physical channel 84 in the transmit mode and an R.F. front end 87 in the receive mode. Front end 87 may include a low noise input stage and a high gain second stage, and include transmit switching to prevent feedback during transmission by driver 86. A sync pulse extractor 88 is used to extract the synchronization pulse from the received information at R.F. front end 87.

Figure 5:
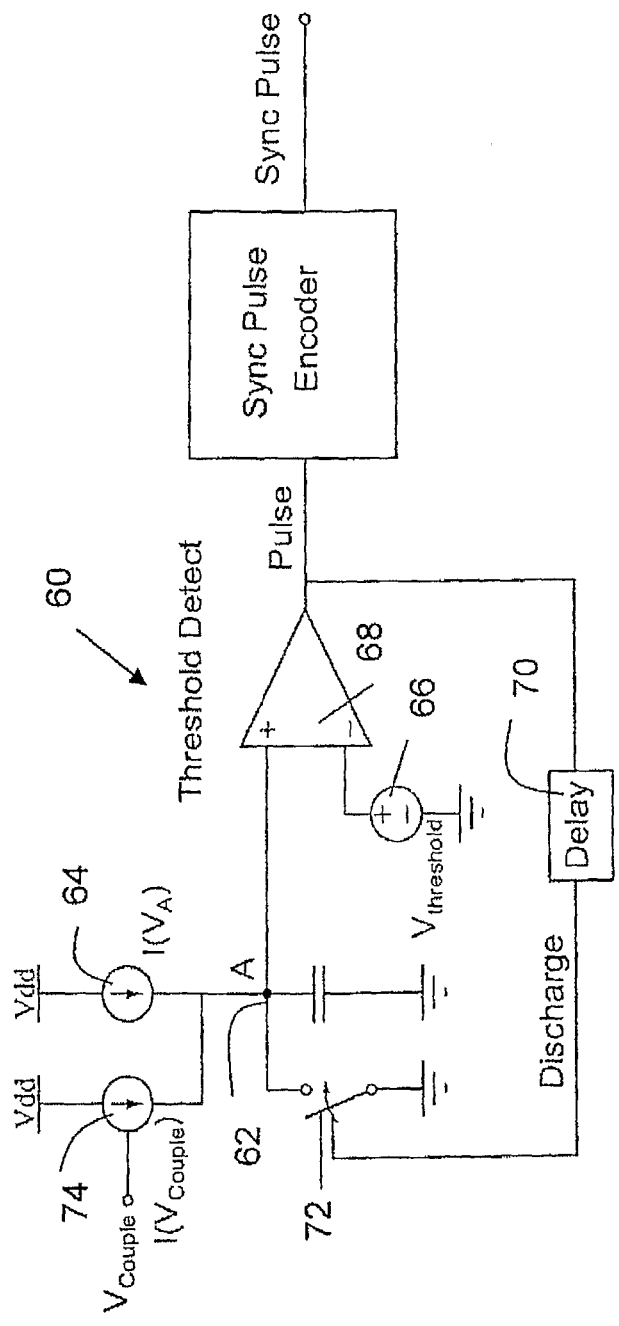
FIG. 5 is an analog circuit schematic implementing the oscillator circuit of FIG. 4.
Figure 6B:
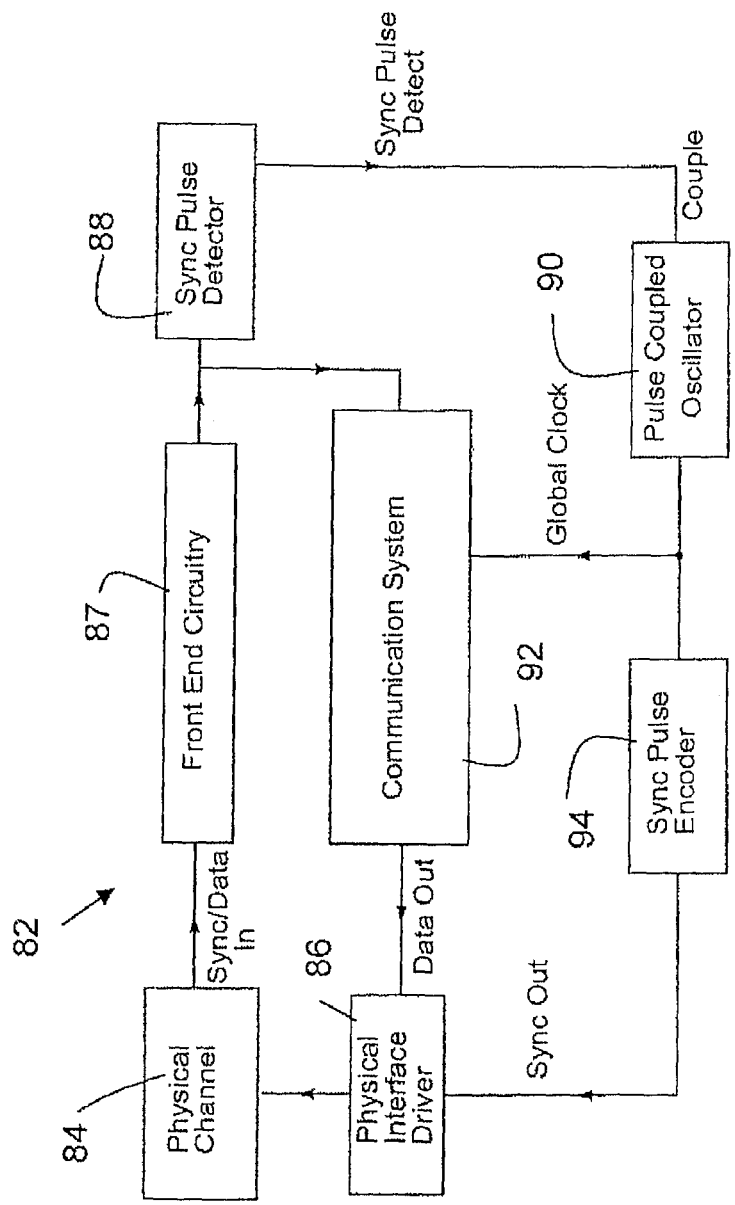
FIG. 6B is a schematic block diagram of a transceiver node for the network of FIG. 6A, constructed in accordance with one embodiment of the present invention.

Each node 82 also implements the pulse coupled oscillator 90 described above in reference to FIG. 5A, whereby the global clock in the system is mutually created. This global clock may be used by a communications system 92 to facilitate communications between individual nodes 82. The communications system 92 may or may not be on the same node as that implementing the PCO functionality, as is shown in FIG. 6B. However in any either case, the global clock is generated through the PCO function and the communications system 92 uses it to time its communications. The generated clock is also transmitted out after a possible sync pulse encoding process 94, to satisfy the requirement each node 82 in the pulse coupled oscillator system 80 must emit coupling to the other nodes 82.

Figure 7:
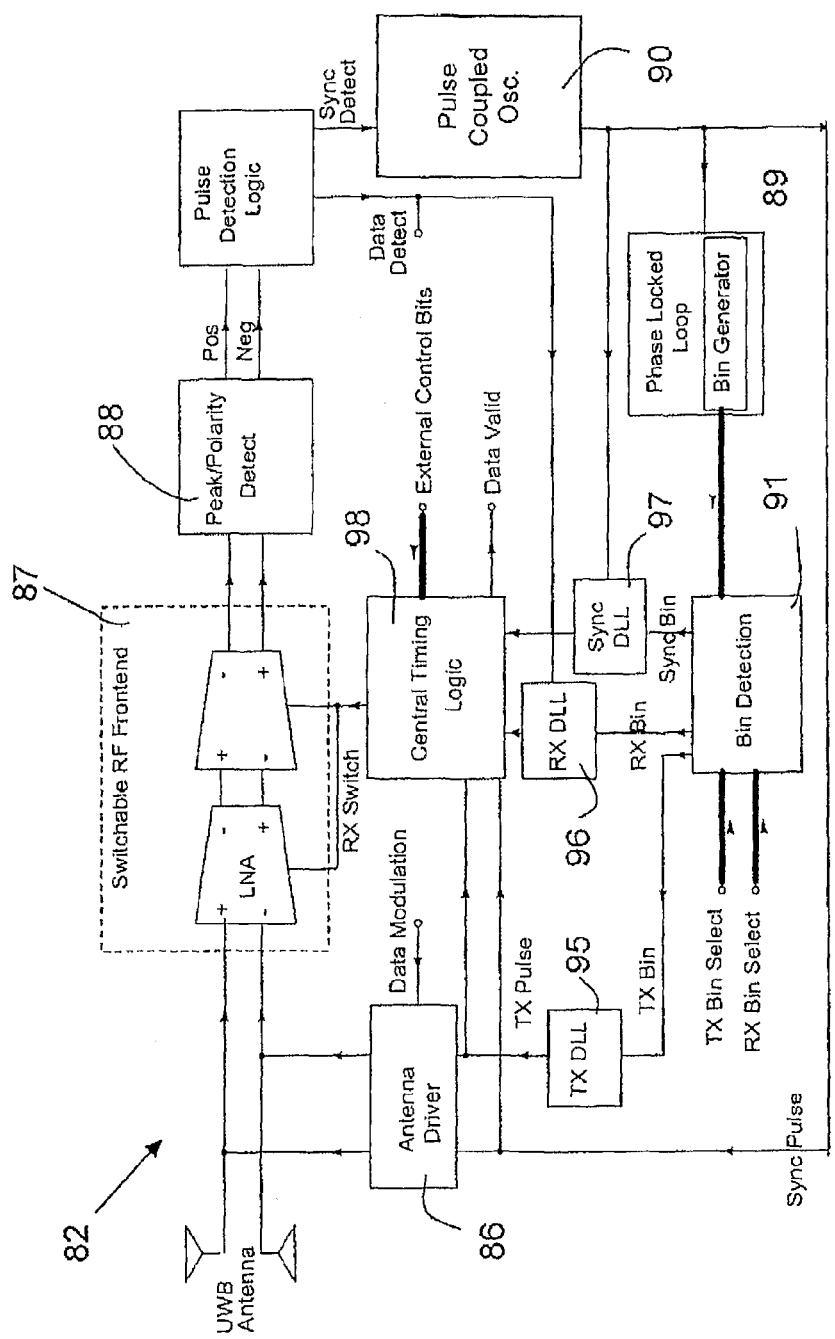
FIG. 7 is a more detailed block diagram of a transceiver node for the network of FIG. 6A, constructed in accordance with one embodiment of the present invention.

FIG. 7 shows a more specific manifestation of the general node 82 of FIGS. 6A and 6B. In front end 87, a generic four stage differential amplifier chain is used to provide gain from the antenna. Each differential amplifier stage is implemented as a simple cascoded common source with resistive feedback Each stage provides 11 dB of gain, with earlier stages drawing more current and using larger devices while later stages consume less current and use larger resistors. The stages are AC coupled. To demonstrate PCO synchronization, the receive amplifiers are neither designed to match 50Ω nor have optimum noise figure. The amplifiers are designed to turn off and on rapidly. For that purpose, the differential amplifier stages include an NFET switch that turns on or shuts off the current to the amplifier. Inductors are avoided so that we may generalize this design to a simple digital CMOS process. This RF front end consumes 21 mW when on.

Figure 1:
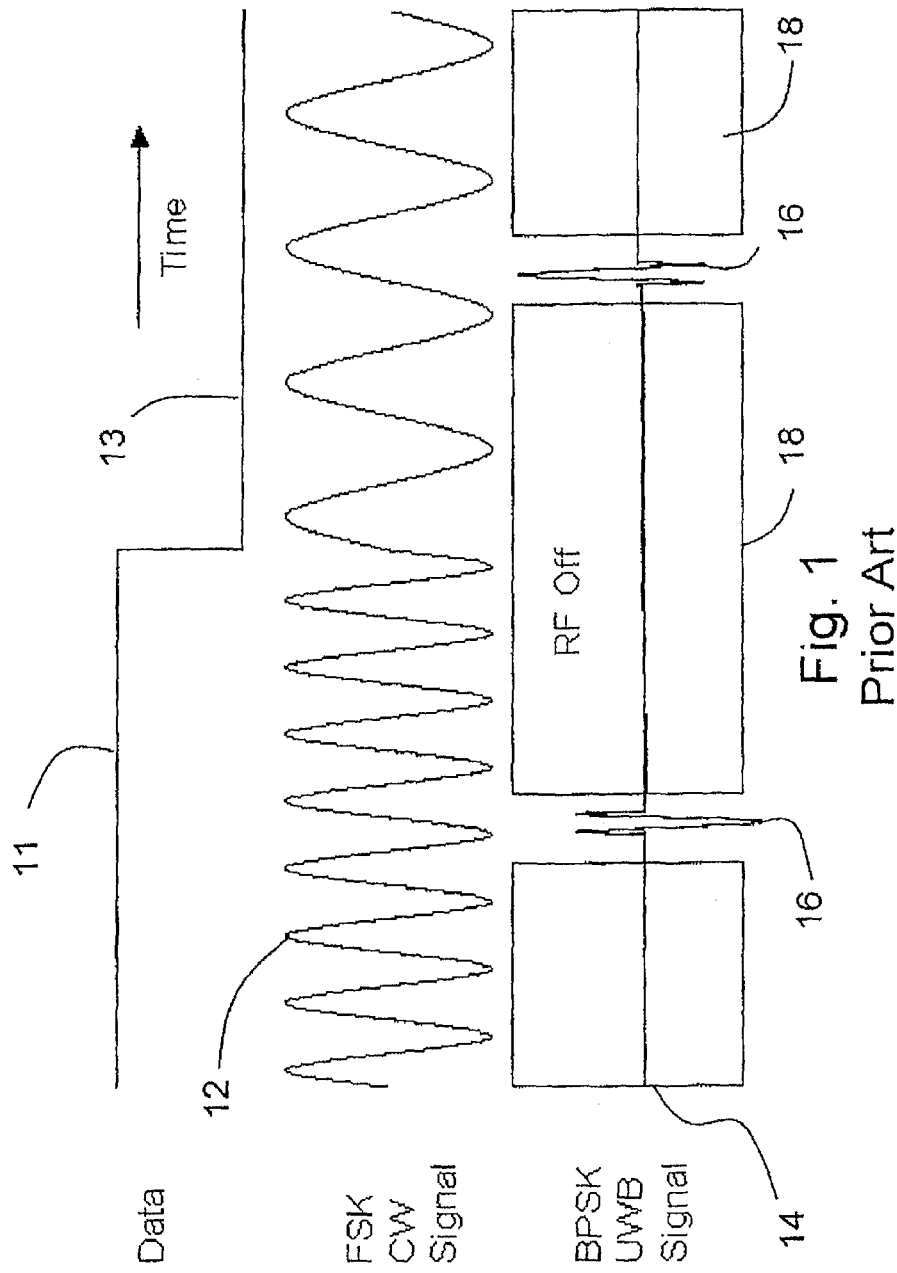
FIG. 1 is a Prior Art diagram of the difference between traditional continuous wave communications and UWB transmissions.
Figure 2:
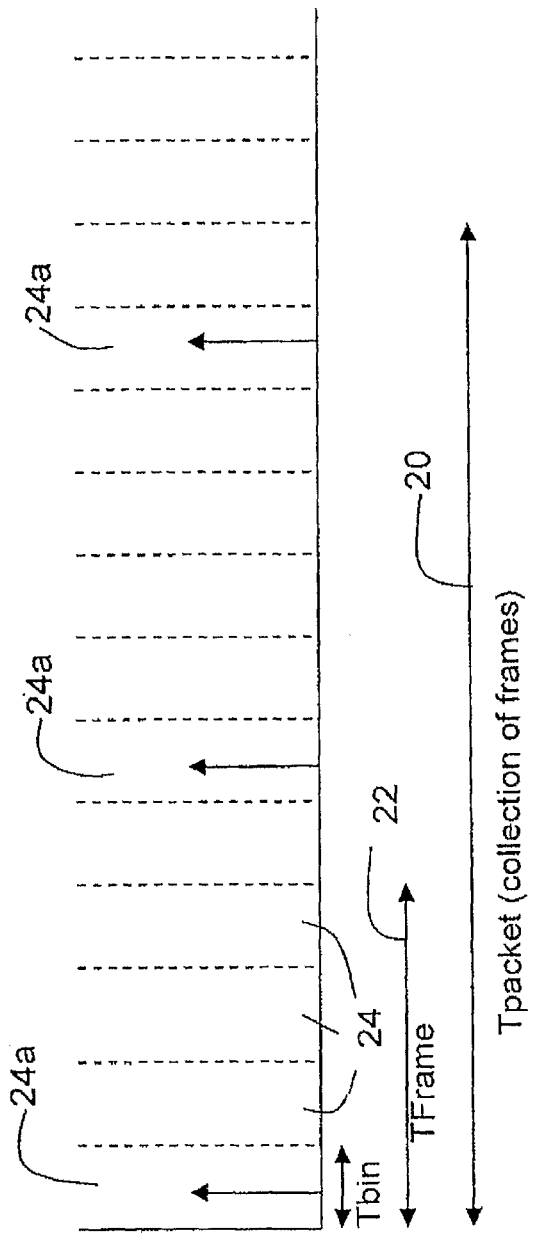
FIG. 2 is a Prior Art schematic of time domain multiplexing with each packet including three frames and each frame include four bins.

FIG. 7 shows the additional detail of a phase locked loop 89, that takes the output of the pulse coupled oscillator 90 and divides each cycle of oscillator 90 in to a plurality of time frames and time bins as described in reference to FIG. 2. This time frame and time bin data is coupled to a Bin detection circuit 91 which receives inputs from a separate controller as to which bins to use for each of the transmit, receive and synchronize functions. This bin detection data is further used by further delay locked loops 95, 96, 97 to more finely control the transmit, receive and synchronize functions, respectively. A Central timing logic 98 takes the outputs of the delay locked loops 95-97 and the state of the system defined by a set of input control bits from an external controller (microcontroller, microprocessor, DSP, FPGA, hardware state machine implementation) to decide if the RF should be turned off. The central timing logic 98 also detects if lock was lost and gives that information to the controller. Finally the central timing logic 98 also determines if a valid pulse was detected and will provide the data to the controller to record.

The external controller is responsible for maintaining the state of the system (to determine in which step of the above process the node is functioning), to provide the bin of transmission and reception, to implement a suitable encoding scheme for the bit error rate of the system, and to record the detected data pulse. Since all pulse detection and processing functions are implemented on chip, the external controller only needs to run at the pulse rate, which is the slowest timescale in the system. Thus, even a simple, low cost microcontroller can be used as the controller.

Figure 3D:
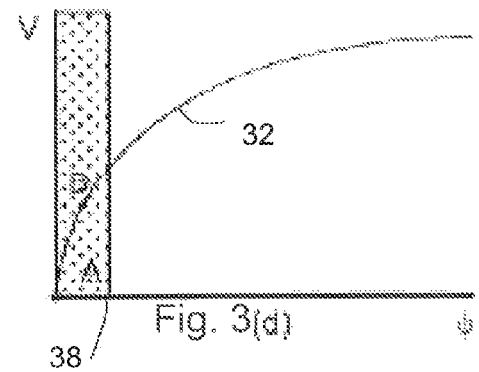
Figure 8:
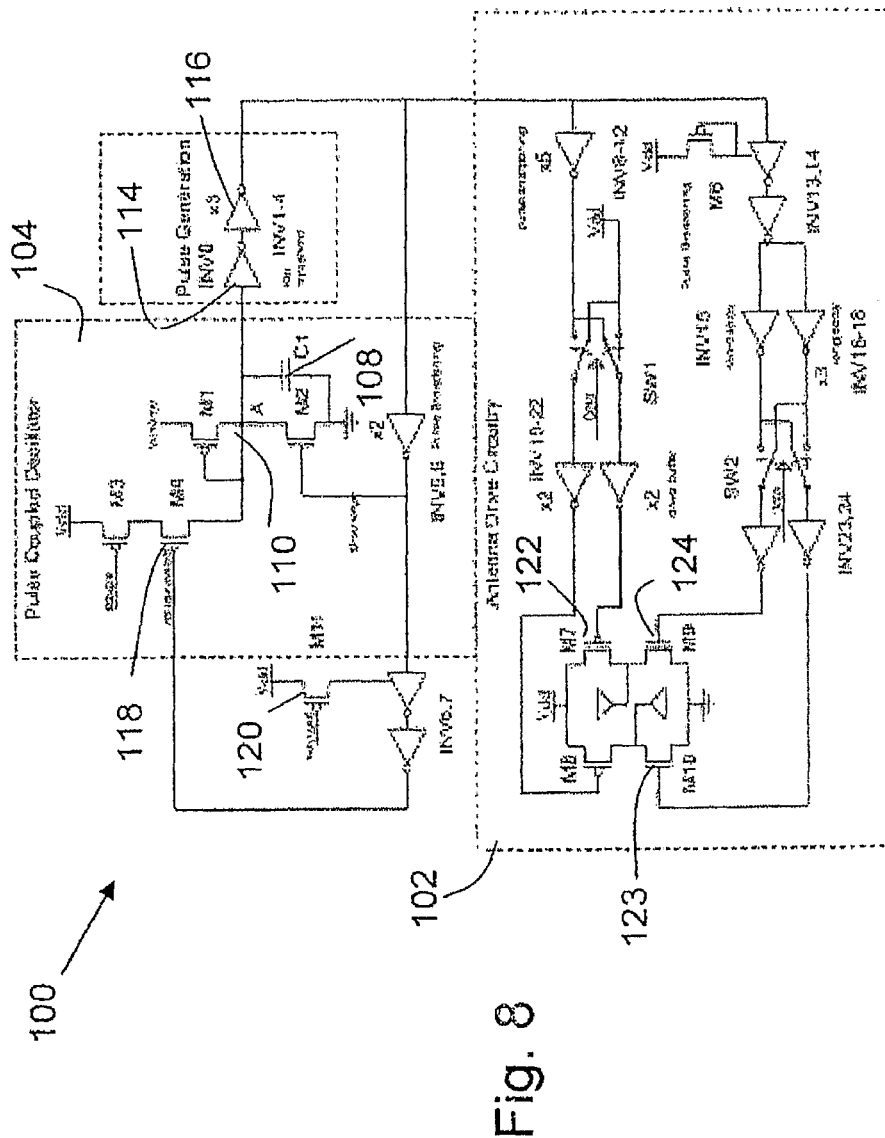
FIG. 8 is an integrated circuit schematic for a portion of the transceiver node of FIG. 7.

FIG. 8 shows a more detailed schematic of an integrated circuit 100 which implements both the pulse coupled oscillator 102 and the PCO oscillator 104. Transistor M1 106 is a diode connected PFET that charges up capacitor C1 108. At node A 110, the voltage is monotonically increasing and concave down, since the rise in voltage at node A 110 decreases M1's current. PFET M3 112 can also inject current into node A 110 and is used to implement the $\Delta V$ pulse coupling aspect of the PCO function. The PCO state function is thus generated on node A 110. Inverter INV0 114 is used for threshold detection, and is sized so it switches at low threshold. After the charge-up voltage at node A 110 crosses INV0's threshold, a pulse is generated out of inverters INV 1-4 116. This pulse then performs two functions: first it generates the blackout period 38 (FIG. 3(d)) required by shutting off M4 118. This blackout period is tunable through M11 120.

Secondly, the pulse from inverters INV1-4 116 differentially drives a UWB antenna modeled as a fourth order LC resonant circuit. First transistors M7 122 and M10 123 are turned on, causing initial resonance on the antenna. Since we want brief pulses, we turn on M9 124 a short time later to damp that resonance. Inverters INV8 through INV24 are used to control the timing of the antenna driver through various delays. Switches SW1 and SW2, implemented using standard pass gates, enable BPSK modulation by driving in the aforementioned manner, or by driving with the opposite polarity using M8, M9 and M10.

Figure 9:
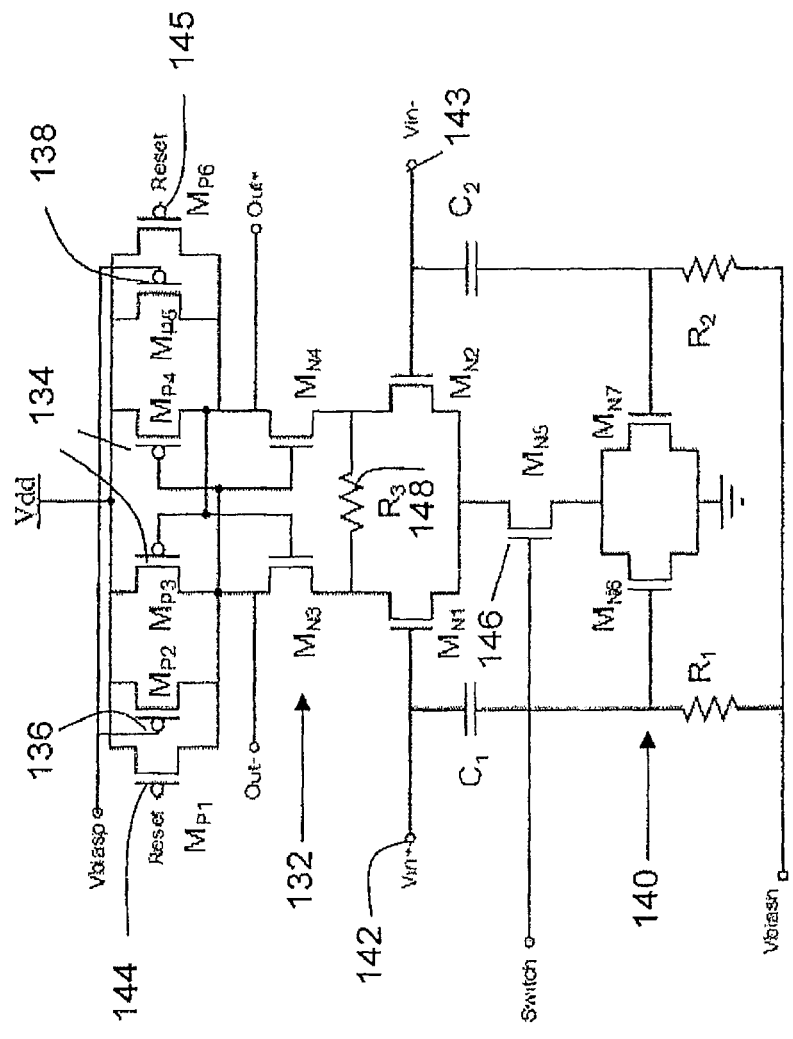
FIG. 9 is an integrated circuit schematic for another portion of the transceiver node of FIG. 7.

FIG. 9 shows a peak polarity detector 130 schematic implemented in an integrated circuit. The peak polarity detector 130 is used to detect the reception of the pulse by the RF front end 87. Polarity detector is based on a clocked sense amplifier circuit. When there is no signal, total circuit bias current is 1 µA and the positive feedback mechanism through inverter pair MN3,4 132, MP3,4 134 is suppressed by the presence of MP2 136 and MP5 138, which hold the outputs near VDD. Since we don't have a clock, we allow subthreshold bias transistors MN6,7 140 to accept AC coupling from the inputs, Vin+ 142 and Vin– 144. Since Vin+ and Vin– are differential signals, one gate node moves up and the other moves down in voltage. Due to the exponential I-V relationship of transistors biased in subthreshold, the node that moves up increases the current in the circuit by orders of magnitude while the node that moves down negligibly subtracts from the total current. This increase in current strengthens the positive feedback inverters and causes the output nodes to drive in opposite directions depending on the input polarity of Vin+ and Vin–. Reset transistors MP1 144 and MP6 145 are used to quickly drive the output nodes back to its initial state after detection of a pulse to allow fast detection of the next pulse. The peak polarity detector can be disabled through switch MN5 146. A small resistor R3 148 is used to hold NFET MN3,4 132 sources to the same voltage, allowing the positive feedback mechanism to work more effectively. This circuit can be biased at low power yet can still detect very temporally brief pulses. In contrast to a fast, synchronous ADC, this asynchronous pulse detector consumes high currents only when it needs to, and can detect differing polarities without additional signal processing.

The transceiver and network described herein establishes network communications by first establishing synchronization between the various nodes. Initially all transmitter and receiver nodes are in an unsynchronized state. At this point, all the nodes 82 transmit their synchronization pulse, which continually couples into each nodes' PCO circuit 90. This causes all the nodes to precisely synchronize. Both transmitter and receiver then transition into the locking state where they lock a high divide ratio phase locked loop (PLL) to the sync signal, which serves as the global clock in the system. This local clock can be used to time "bins" in each "frame" such that transmission codes can be uniquely defined and detected for each node. Upon the reception of the synchronization sequence, the receiver and transmitter know they are matched to within a bin and hence can turn off the RF for all but 2 bins (the known data bin and the synchronization bin). This lowers the duty cycle and hence the RF power consumption to $2/N_{BINS}$. At this point, secondary acquisition can occur with delay locked loops triggered by the bin valid rising edge. The delay locked loops lock to the arrival time of the pulse and turn on the RF amplifier shortly before the pulse is expected to arrive. The same process occurs in the sync bin. This generates a very tight window of time when the RF system is on around the anticipated arrival time of the pulse. It should be noted that the roles of transmitter and receiver are interchangeable, since both circuits are identical, and in principle full duplex communications is possible.

The present invention uses pulse coupled oscillators (PCOs) to replace the external crystal as the frequency reference source in node to node communications thus allowing implementation in semiconductor circuits. Collections of nodes using the PCO system have been rigorously proven to synchronize in a self organizing manner, thereby generating a global clock that is common to the communicating nodes. The PCO system also has the characteristic where the network will self-recover from any node joining in or leaving. With a global clock established, node to node communications can then be established based on that global clock. The present invention is probably most useful for ultra-wideband, impulse based communications systems, since comparable alternative methods for establishing a common reference time between receiver and transmitter are not implemented in a semiconductor circuit.

The present invention is illustratively described above in reference to the disclosed embodiments. Various modifications and changes may be made to the disclosed embodiments by persons skilled in the art without departing from the scope of the present invention as defined in the appended claims.

What is claimed is:

1. A transceiver, comprising:
one or more integrated circuits including
an R.F front end adapted for connection to an antenna,
a pulse detector coupled to the R.F. front end and adapted for detecting received pulses intended for the transceiver, and
a pulse coupled oscillator including a monotonically increasing state function that is concave downward, wherein the oscillator is adapted for receiving synchronizing pulses from the pulse detector and for causing a predetermined incremental increase in the state function in response to received synchronizing pulses.

2. The transceiver of claim 1, wherein the pulse coupled oscillator is adapted to include a blackout period, right after a state change, when state increments are not enabled.

3. The transceiver of claim 1, wherein the pulse detector is adapted to distinguish synchronizing pulses for the oscillator from data pulses being sent to the transceiver.

4. The transceiver of claim 1, further comprising a control timer coupled to the oscillator and adapted to divide each cycle of the oscillator in to a multiplicity of time bins.

5. The transceiver of claim 4, wherein the control timer is adapted to enable the transceiver to detect any data signals present in predetermined ones of the time bins.

6. The transceiver of claim 4, further comprising a controller coupled to the control timer and adapted to disconnect power to the R.F. front end during predetermined time bins.

7. The transceiver of claim 6, wherein the controller is adapted to only connect power to the R.F. front end during time bins when the transceiver is intended to receive data pulses and synchronizing pulses.

8. The transceiver of claim 1, further comprising a control timer coupled to the oscillator and adapted to divide each cycle of the oscillator in to a multiplicity of time frames and each time frame in to a multiplicity of time bins, and wherein the control timer is adapted to enable the transceiver to detect any signals present in a same predetermined time bin in each time frame.

9. A wireless network, comprising a plurality of transceivers of claim 1.

10. A wireless network, comprising: a plurality of nodes with each node including a respective pulse coupled oscillator implemented in a semiconductor circuit and having a monotonically increasing state function that is concave downward, wherein each oscillator is adapted to generate a change of state pulse at the end of a state function cycle; and transmit/receive circuitry located in each node and adapted for transmitting change of state pulses from each respective oscillator to other nodes in the network, and further adapted for receiving change of state pulses from other nodes in the network and applying them to the respective oscillator to cause an incremental increase in the state function in the respective oscillator.

11. The wireless network of claim 10, wherein each transmit/receive circuitry includes an R.F. front end and a pulse detector coupled to receive signals from the R.F. front end and adapted to identify synchronizing delta pulses from the other nodes.

12. The wireless network of claim 10, wherein each pulse coupled oscillator is adapted to include a blackout period, right after a state change, when state increments are not enabled.

13. The wireless network of claim 10, wherein each node includes a control timer coupled to the respective oscillator and adapted to divide each cycle of the oscillator in to a multiplicity of time bins.

14. The wireless network of claim 13, wherein the control timer is adapted to enable the respective transceiver to detect any data signals present in predetermined ones of the time bins.

15. The wireless network of claim 13, wherein each node includes a controller coupled to the control timer and adapted to disconnect power to the R.F. front end during predetermined time bins.

16. The wireless network of claim 10, wherein each node includes a control timer coupled to the oscillator and adapted to divide each cycle of the oscillator in to a multiplicity of time frames and each time frame in to a multiplicity of time bins, and wherein the control timer is adapted to enable the transceiver to detect any data signals present in a same predetermined time bin in each time frame.

17. The wireless network of claim 10, wherein each node is adapted to receive synchronizing pulses from other nodes over the wireless network.

* * * * *